(12) United States Patent
Schilling et al.

(10) Patent No.: US 6,806,231 B2
(45) Date of Patent: Oct. 19, 2004

(54) DRILLING FLUID, APPARATUS, AND METHOD

(75) Inventors: Kevin H. Schilling, Muscatine, IA (US); Michael Riley, Muscatine, IA (US); David F. Cali, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 4 days.

(21) Appl. No.: 10/336,540

(22) Filed: Jan. 3, 2003

(65) Prior Publication Data

US 2003/0199396 A1 Oct. 23, 2003

Related U.S. Application Data (63) Continuation of application No. 09/941,099, filed on Aug. 28, 2001, now Pat. No. 6,518,223, which is a continuation-in-part of application No. 09/638,564, filed on Aug. 14, 2000, now abandoned.

(51) Int. Cl.$^7$ .............................. C09K 7/02; C09K 7/00
(52) U.S. Cl. ...................... 507/104; 507/110; 507/111; 507/112
(58) Field of Search ............................... 507/104, 110, 507/111, 112

(56) References Cited

U.S. PATENT DOCUMENTS

| | | |
|---|---|---|
| 2,271,696 A | 2/1942 | Jones |
| 2,771,138 A | 11/1956 | Beeson |
| 2,807,570 A | 9/1957 | Updegraff |
| 2,986,213 A | 5/1961 | Fox |
| 3,738,437 A | 6/1973 | Scheuerman |
| 4,038,481 A | 7/1977 | Antrim et al. |
| 4,142,595 A | 3/1979 | Anderson et al. |
| 4,447,341 A | 5/1984 | Block |
| 4,502,969 A | 3/1985 | Shell |
| 4,526,693 A | 7/1985 | Son et al. |
| 4,634,538 A | 1/1987 | Alexander |
| 4,743,384 A | 5/1988 | Lu et al. |
| 4,757,862 A | 7/1988 | Naiman et al. |
| 4,963,273 A | 10/1990 | Perricone et al. |
| 4,988,450 A | 1/1991 | Wingrave et al. |
| 5,110,484 A | 5/1992 | Sheu et al. |
| 5,198,415 A | 3/1993 | Steiger |
| 5,208,216 A | 5/1993 | Williamson |
| 5,211,250 A | 5/1993 | Kubena, Jr. et al. |
| 5,403,820 A | 4/1995 | Walker |
| 5,479,987 A | 1/1996 | Hale |
| 5,494,120 A | 2/1996 | Hale et al. |
| 5,593,952 A | 1/1997 | Jarrett |
| 5,602,082 A | 2/1997 | Hale et al. |
| 5,607,904 A | 3/1997 | Jarrett |
| 5,635,458 A | 6/1997 | Lee et al. |
| 5,684,075 A | 11/1997 | Patel et al. |
| 5,686,396 A | 11/1997 | Hale et al. |
| 5,693,698 A | 12/1997 | Patel et al. |
| 5,710,107 A | 1/1998 | Walker |
| 5,925,598 A | 7/1999 | Mody et al. |
| 6,054,416 A | 4/2000 | Bland |
| 6,247,543 B1 | 6/2001 | Patel et al. |
| 6,248,698 B1 | 6/2001 | Mullen et al. |
| 6,518,223 B2 * | 2/2003 | Schilling et al. ............ 507/104 |

FOREIGN PATENT DOCUMENTS

| | | |
|---|---|---|
| DE | 197 14 166 A1 | 8/1998 |
| EP | 0134084 A1 | 3/1985 |
| EP | 0175412 A2 | 3/1986 |
| GB | 2 365 896 A | 2/2002 |
| WO | WO 91/05832 | 5/1991 |
| WO | WO 97/19145 | 5/1997 |
| WO | WO 00/43465 | 7/2000 |

OTHER PUBLICATIONS

Wurzburg, M.S., *Modified Starches: Properties and Uses*, CRC Press, Inc., 187–188, Boca Raton, Florida.

* cited by examiner

Primary Examiner—Philip C. Tucker
(74) Attorney, Agent, or Firm—Banner & Witcoff, Ltd.

(57) ABSTRACT

Disclosed are drilling fluids suitable for use in connection with oil well drilling. The drilling fluids of the invention include in one embodiment a liquid base, an alkyl glucoside, such as methyl glucoside, and a borehole stability agent that includes a maltodextrin, a carboxyalkyl starch, a hemicellulose-containing material, or a mixture of the foregoing. In another embodiment, the drilling fluid includes a liquid base and desugared molasses solids, preferably in combination with an alkyl glucoside and more preferably in further combination with one of the aforementioned borehole stability agents. The drilling fluids of the invention surprisingly have a reduced tendency to swell shale as compared with known drilling fluids. Also disclosed are a drilling apparatus and process. The drilling apparatus includes a drill string, which may be conventional, that is fluidically coupled to a source of drilling fluid, the source of drilling fluid including the drilling fluid of the invention. The process of the invention includes the step of circulating the drilling fluid of the invention through a drill string during borehole drilling.

5 Claims, 1 Drawing Sheet

DRILLING FLUID, APPARATUS, AND METHOD

RELATED APPLICATION

This application is a continuation of prior art application Ser. No. 09/941,0991 filed on Aug. 28, 2000, now U.S. Pat. No. 6,518,223 (Schilling et al.) which in turn was a continuation-in-part of prior application Ser. No. 09/638,564 filed on Aug. 14, 2000 (Schilling et al.) now abandoned, the entire contents of each prior application are hereby incorporated by reference in their entireties.

TECHNICAL FIELD OF THE INVENTION

The invention is in the area of drilling fluids used in connection with drilling wells, such as oil wells and water wells. The invention is also directed towards a drilling apparatus and process.

BACKGROUND OF THE INVENTION

In drilling a well or other similar borehole, a drill bit is operatively coupled, usually by a drill string, to a drive which rotates the drill bit to cause the drill bit to bore into the earth. A drilling fluid, or drilling mud, is circulated through the borehole annulus. The drilling fluid passes through the drilling string and to the surface through the drill bit for cooling and lubricating the drill bit and for carrying rock cuttings generated by the cutting action of the bit to the surface. The drilling fluid may be a gas, but more typically is a liquid.

Many liquids suitable for use as drilling fluids are known. Some drilling fluids are oil-based. Such oil-based fluids suffer from a number of drawbacks, particularly, their adverse effects on the environment. Oil-based fluids also can be costly to purchase and to dispose of.

Other drilling fluids are water-based or constitute an emulsion of oil in water or water in oil. Such fluids often are inexpensive compared to oil-based fluids, and are less costly to dispose of. Water-based fluids also pose less of a risk to the environment than do oil-based fluids. One drawback associated with water-based fluids is that the water in the fluid tends to promote borehole instability, particularly when shale is encountered in the drilling process. The water-based fluid may adsorb and absorb into pores in the shale, thus causing the shale to swell and thereby tending to cause the borehole to collapse.

In recognition of this drawback, water-based drilling fluids have incorporated an alkyl glycoside, such as methyl glucoside, into the drilling fluid. It is known that methyl glucoside serves as a borehole stabilizing agent that functions by inhibiting shale swelling. The mechanism of action of methyl glucoside is not fully understood, but is believed to be associated with gel formation or an ion exchange phenomenon. It is generally believed that the methyl glucoside, in adding gel strength to the drilling fluid, causes more rapid formation of filter cake on the borehole wall thereby allowing less water filtrate to reach the surrounding shales. This is believed to reduce swelling and sloughing of the shale.

While known drilling fluids that include methyl glucoside are satisfactory, there remains room for improvement in such fluids in the area of borehole stability. It is a general object of the invention to provide a drilling fluid that is suitable for use in borehole drilling. Another general object is to provide a drilling apparatus and process that incorporate the drilling fluid of the invention.

THE INVENTION

It has now been discovered that both maltodextrins, on the one hand, and hemicellulose-containing materials, on the other hand, function to assist glycosides in promoting borehole stability in a drilling fluid. It has further been found that carboxyalkyl starches, in particular carboxymethyl starches, also function to assist glycosides in promoting borehole stability. Surprisingly, these ingredients promote borehole stability more so than other organic species of similar origin or chemical structure when used in conjunction with an alkyl glucoside. In accordance with the invention, a drilling fluid comprises a liquid base, an alkyl glycoside, which preferably is methyl glucoside; and a borehole stability agent that comprises a maltodextrin, a carboxyalkyl starch, and/or hemicellulose. Also encompassed by the invention is a drilling fluid that includes methyl glucoside and cellulose. The invention also encompasses a drilling apparatus and a process for drilling. The drilling apparatus comprises a drilling string that is fluidically coupled to a source of drilling fluid, the drilling fluid including in one embodiment a liquid base, an alkyl glycoside, and one or more of a maltodextrin, a carboxyalkyl starch, and a hemicellulose-containing material and, in another embodiment, a liquid base, an alkyl glycoside, and cellulose. The process of the invention includes the steps of circulating the drilling fluid of the invention through a drill string as a borehole is cut into the earth, optionally in conjunction with hemicellulose, a maltodextrin, a carboxyalkyl starch and/or cellulose.

It has further been found that desugared molasses functions effectively as a borehole stabilizing agent. In accordance with another embodiment of the invention, a drilling fluid comprises a liquid base, optionally an alkyl glucoside, and a borehole stabilizing agent that comprises desugared molasses solids. Also encompassed by this embodiment of the invention are a drilling apparatus and a process for drilling. More generally, the various borehole stabilizing agents discussed hereinabove may be combined with the all glucoside to form a drilling fluid. Thus, for instance, the drilling fluid may comprise an alkyl glucoside, desugared molasses solids, and one or more of hemicellulose, a maltodextrin, and a carboxyalkyl starch Other features and embodiments of the invention are discussed hereinbelow and are set forth in the pending claims.

DESCRIPTION OF THE PREFERRED EMBODIMENTS

The drilling fluid of the invention generally comprises in one embodiment a liquid base, an alkyl glycoside, and a borehole stability agent, and may include other components and additives as may be deemed appropriate. In another embodiment, the drilling fluid comprises a liquid base, desugared molasses solids, optionally in conjunction with an alkyl glucoside or a borehole stability agent, and further optionally including other components and additives as may be deemed appropriate.

The liquid base used in the drilling fluid of the invention comprises water, a water-miscible liquid, or a mixture of a water-miscible liquid with water. If the liquid base includes water, the water may be provided from any suitable source. For example, when the oil drilling apparatus is off-shore or near the ocean, sea water is the preferred liquid base inasmuch as it is freely available. The water may also comprise treated water, softened water, tap water, natural or artificial brine, or other suitable water source. The water miscible liquid may be glycerine, polyglycerine, a polyether, a polyol, or other suitable water miscible liquid. The liquid base may be present in any amount suitable to carry, dissolve and/or suspend the components of the drilling fluid. Preferably, the liquid base is present in the drilling fluid in a total amount ranging from about 5 to about 7.5, more preferably, about 5.5 to about 6 lbs./gallon. It is further contemplated that the liquid base may be used in an oil-based system that comprises an emulsion of oil in water or water in oil.

The drilling fluid of the invention in one embodiment further includes an alkyl glycoside. Alkyl glycosides are a known class of industrial chemicals and are formed by the substitution of the hemiacetal hydroxyl group of a lower order saccharide (i.e., a polysaccharide having a degree of polymerization less than about 7) with an alkyl radical having from one to four carbon atoms. The alkyl radical may be methyl, ethyl, propyl, isopropyl, n-butyl, s-butyl or t-butyl, and the saccharide may be, for example, glucose, maltose, maltotriose, or maltotetraose.

The alkyl glycoside used in conjunction with the invention is preferably methyl glucoside. Most preferably, the methyl glucoside is provided in the form of MeG-206, an aqueous methyl glucoside solution sold by Grain Processing Corporation of Muscatine, Iowa MeG-206 is a 60% aqueous solution of methyl glucoside, the methyl glucoside being present in a 2:1 ratio of $\alpha:\beta$ isomers (this ratio should be regarded as approximate). The methyl glucoside also may be provided in the form of MeG-365, also sold by Grain Processing Corporation of Muscatine, Iowa MeG-365 is a 65% aqueous solution of methyl glucoside which exists in the solution as a 2:1 ratio of $\alpha:\beta$ isomers (this ratio also should be regarded as approximate). Another suitable methyl glucoside may be provided as a 70% 1:1 (approximate) mixture of $\alpha:\beta$ methyl glucoside isomers. More generally, any other suitable mixture of methyl glucoside isomers may be employed in conjunction with the invention.

The alkyl glycoside may be present in any amount effective to inhibit shale swelling. Preferably, when the alkyl glycoside is methyl glucoside, the methyl glucoside is present in the drilling fluid in an amount ranging from about 2 to about 4 lbs./gallon of the drilling fluid (dry basis MeG).

In another embodiment of the invention, the drilling fluid comprises or includes desugared molasses solids. It is contemplated that non-desugared molasses may be substituted for molasses in this embodiment. Desugared molasses is the by-product of the process used to extract sugar from sugar beet or cane sugar molasses or from other types of molasses (e.g., sorghum or citrus molasses). Preferred embodiments of the invention make use of desugared sugar beet molasses or desugared sugar cane moles. With respect to sugar beet molasses, as is well known in the art, sugar beets are used to produce commercial grade sugar that serves as a substitute for the often more expensive cane sugar. The older of the two most widely used processes of removing sugar from sugar beets involves cleaning the beets and slicing them into thin chips. The sliced beets are then subjected to a sugar extraction process whereby hot water is passed over the beets for approximately one hour. This process removes most, but not all, of the sugar from the beets in the form of beet "juice." The beets are then pressed in screw presses to remove the remaining juice therefrom. The juice is then subjected to a process called carbonation, whereby small clumps of chalk are provided in the juice to filter out any non-sugars. The chalk is then filtered from the juice, which is then evaporated a syrup. The syrup is then boiled until sugar crystals form therein. Once the crystals form, the resulting mixture is centrifuged to separate the crystals from the remaining product, which remaining product is characterized as molasses. Desugared sugar beet molasses preferably is prepared by a process known as the Steffen process, in which a calcium precipitate is formed to remove additional sugar. This process is described briefly in U.S. Pat. No. 5,639,319 to Daly, which purports to teach the use of desugared sugar beet molasses as a tire ballast. Another process for desugaring molasses involves an ion exchange reduction of the sugar content. With respect to desugared sugar cane molasses, this product may be obtained via any method or process known in the art or otherwise found to be suitable. Likewise, sugar beet or other types of molasses may be obtained via any other method known in the art or found to be suitable.

In either instance, the desugared sugar molasses is a liquid that contains approximately 60 to 80% solids, often 60 to 75% solids. The solids contained in the sugar beet molasses are not particularly well characterized, but generally speaking, the molasses generally includes residuals, organic acids, salts, proteinaceous material, and other materials. In some embodiments of the invention, desugared molasses is used alone as the drilling fluid in a drilling process or apparatus. For this embodiment, the molasses can be said to comprise a liquid base (water) in which is carried desugared molasses solids. It should be noted that although the invention encompasses embodiments wherein molasses solids are obtained via drying a molasses solution to solids, the invention is not limited thereto, and the "liquid base" and "desugared molasses solids" may together comprise conventional desugared molasses or conventional desugared molasses that has been diluted. More preferably, the desugared sugar beet molasses is diluted with a liquid base such as water to a solids content of about 20% to about 60%. In accordance with a highly preferred embodiment of the invention, the drilling fluid includes both an alkyl glucoside and desugared molasses solids. In this embodiment, the alkyl glucoside and the desugared sugar beet molasses solids may be present in any proportion with respect to each other and preferably are present in a total solids content in the drilling fluid ranging from about 40% to about 80% .

In accordance with preferred embodiments of the invention, the drilling fluid further includes a borehole stability agent that is selected from among maltodextrins, carboxymethyl starches, and hemicellulose. With respect to hemicellulose, hemicellulose is a term used to refer to a wide variety of heteropolysaccharides found in association with cellulose in plant species. The hemicellulose functions to inhibit shale swelling, and may further function as a fluid loss control agent. The hemicellulose may be added in a purified form. Most preferably, the hemicellulose-containing material is produced in accordance with the teachings of U.S. Pat. No. 4,038,481 (Antrim et al.), which discloses the alkaline hydrolysis of corn hulls to yield plural phases including a hemicellulose-rich fraction. The hemicellulose-rich fraction prepared in accordance with the teachings of this patent may be used as the hemicellulose-containing material without subsequent isolation or purification, or this fraction may be concentrated or otherwise modified. The alkaline hydrolysis itself preferably is conducted using potassium hydroxide as the alkaline hydrolyzing species. Potassium is itself believed to function as a shale stability enhancer in a drilling fluid, and thus the potassium hydroxide digest of corn hulls is believed to be particularly suitable for use in conjunction with the invention. More economically, an unrefined aqueous slurry (for example, an alkaline digest of corn hulls) may be used. More generally, hemicellulose may be provided in an unpurified, somewhat "crude" form or in a highly purified form with the purer hemicellulose being preferred from a technical standpoint, but with cruder forms being more economical. In some instances a greater amount of the crude hemicellulose may be desired to achieve the same results as by adding a purer form of hemicellulose.

The hemicellulose-containing material is used to provide hemicellulose in the drilling fluid in an amount effective to inhibit swelling of shale. Preferably, if the drilling fluid does not include a maltodextrin, the hemicellulose is present in an amount ranging from about 0.002 to about 0.2 lbs./gallon by dry basis weight. In this embodiment of the invention, these amounts are irrespective of the amount of any cellulose in the drilling fluid.

DP value, and the profile may be partially defined by a saccharide species having a DP value of 1, for example, dextrose or sorbitol. The mixture further may include other saccharide species or other components. Such starting materials may be obtained conventionally, for example, by the partial hydrolysis of starch.

Suitable maltodextrins are sold under the trademark MALTRIN® by Grain Processing Corporation of Muscatine, Iowa. The MALTRIN® maltodextrins are mixtures of malto-oligosaccharides. Each MALTRIN® maltodextrin is characterized by a typical dextrose equivalent value (DE) and DP profile. Suitable MALTRIN maltodextrins that may be incorporated as borehole stability agents in accordance with the invention, include, for example, MALTRIN® M040, MALTRIN® M050, MALTRIN® M100, MALTRIN® M150, and MALTRIN® M180. Typical approximate DP profiles for the subject Maltrin maltodextrins are set forth in the following table (the DP profiles being approximate as indicated in the Table):

| | Typical DP profile (% dry solids basis) | | | | | | | | |
|---|---|---|---|---|---|---|---|---|---|
| DP profile | M180 | | M150 | | M100 | | M050 | | M040 |
| DP > 8 | 46.6 | ±4% | 54.7 | ±4% | 67.8 | ±4% | 90.6 | ±4% | 88.5 ±4% |
| DP 8 | 3.9 | ±2% | 4.8 | ±1.5% | 4.5 | ±1.5% | 1.5 | ±1% | 2.0 ±1% |
| DP 7 | 9.5 | ±2% | 9.1 | ±1.5% | 7.0 | ±1.5% | 1.5 | ±1% | 2.4 ±1% |
| DP 6 | 11.4 | ±2% | 8.4 | ±1.5% | 6.1 | ±1.5% | 1.4 | ±1% | 1.8 ±1% |
| DP 5 | 5.9 | ±2% | 4.7 | ±1.5% | 3.3 | ±1.5% | 1.3 | ±1% | 1.3 ±1% |
| DP 4 | 6.4 | ±2% | 5.5 | ±1.5% | 3.7 | ±1.5% | 1.1 | ±1% | 1.4 ±1% |
| DP 3 | 8.3 | ±2% | 6.7 | ±1.5% | 4.2 | ±1.5% | 1.0 | ±1% | 1.4 ±1% |
| DP 2 | 6.2 | ±2% | 4.8 | ±1% | 2.5 | ±1% | 0.8* | ±1% | 0.9* ±1% |
| DP 1 | 1.8 | ±1.5% | 1.3 | ±1% | 0.7* | ±1% | 0.8* | ±1% | 0.3* ±1% |
| | DE** = 18 | | DE = 15 | | DE = 10 | | DE = 5 | | DE = 5 |

*Minimum Value = 0%
**Dextrose Equivalent Value

The drilling fluid may also include a maltodextrin in lieu of or in addition to the hemicellulose-containing material. Maltodextrins are oligo- or poly-saccharides in which the saccharides are linked exclusively or predominantly by 1–4 linkages. In preferred embodiments, at least 50 percent of the saccharide units in the maltodextrin are linked via 1–4 linkages. More preferably, at least about 60 percent of the saccharide units are linked via 1–4 linkages; even more preferably, at least about 80 percent of the saccharide units are so linked. While the drilling fluid may incorporate any maltodextrin or mixture of maltodextrin species, the invention is particularly applicable to mixtures of maltodextrin species in which at least a portion of the maltodextrins in the mixture have a degree of polymerization (DP) greater than 5. Preferably, at least one of the maltodextrin species in the mixture has a DP of 8 or more. More preferably, at least one species has a DP of at least 10. For example, in some embodiments of the invention, a maltodextrin mixture in which at least 80 percent of the maltodextrin species in the mixture have a DP greater than 5 is used, and in some such embodiments, preferably at least 60 percent have a DP greater than 8. In another embodiment, a maltodextrin in which at least 80 percent of the maltodextrin species have a DP greater than 10 is used. In some embodiments of the invention, the DP profile of the maltodextrin is such that at least 75 percent of the maltodextrin species in the mixture have a DP greater than 5 and at least 40 percent of the species in the mixture have a DP greater than 10. The maltodextrins may include saccharide species having an odd Other suitable maltodextrins as may be known or discovered also may be considered useful in conjunction with the invention.

The maltodextrin may be present in any amount effective to inhibit shale swelling. When the drilling fluid includes a maltodextrin borehole stability agent and does not include hemicellulose, the maltodextrin preferably is present in a total amount ranging from about 0.002 to about 0.2 lbs./gallon, more preferably about 0.01 to about 0.15 lbs./gallon by dry basis weight of the maltodextrin. In this embodiment of the invention, these amounts are irrespective of the amount of cellulose in the drilling fluid.

The borehole stability agent alternatively or additionally may comprise a carboxyalkyl starch, preferably a carboxymethyl starch. Carboxymethyl starches are known in the art, and the preparation of such starches is described in *Modified Starches: Properties and Uses* (Wurzburg, O. B., Ed.) 1986 p. 187–88. When the drilling fluid includes a carboxymethyl starch but does not include any other borehole stability agent, the carboxymethyl starch preferably is present in the drilling fluid in an amount ranging from about 0.002 to about 0.2 lbs./gallon, more preferably about 0.01 to about 0.15 lbs./gallon. In this embodiment, these amounts are irrespective of the amount of cellulose in the composition. The carboxyalkyl starch may have a degree of substitution (DS) of any suitable value. Adequate results may be obtained when the starch has a DS of about 0.2.

The drilling fluid of the invention may incorporate a borehole stability agent that includes a maltodextrin and hemicellulose in any combination of two or more of the foregoing. In such case, the total amount of the combined borehole stability agent present in the drilling fluid preferably ranges from about 0.002 to about 0.2 lbs./gallon by dry basis weight, irrespective of the amount of cellulose in the drilling fluid, with the maltodextrin, starch, and hemicellulose being present in any amount relative to one another. More generally, the borehole stability agent may be present in any amount effective to inhibit shale swelling.

The drilling fluid firer preferably includes a salt, preferably sodium or potassium chloride. Salts are believed to assist the alkyl glycoside and/or the borehole stability agent in inhibiting shale swelling. When sea water is used as the liquid base, or when the bore formation includes salt water, salt will be present in the form of sodium chloride. Other salts that may be incorporated in the composition of the invention include potassium chloride, calcium chloride, sodium acetate, potassium acetate, calcium acetate, and the like. The salt is preferably present in the drilling fluid in an amount ranging from about 0.15 to about 0.8 lbs./gallon by dry basis weight but, more generally, may be present in any amount effective to assist in inhibiting shale swelling.

The drilling fluid may include further additives as may be appropriate. Examples of additives that are known in the art include barite, and other weighting agents, bentonite, low- and-medium-yield clays, salt water clay, iron oxide, calcium carbonate, starch, carboxymethylcellulose, acrylonitrile, gums, molecularly dehydrated phosphate, tannin compound, quebracho, lignins, lignosulfate, mica, sugar cane fibers, and granular materials. Generally, the drilling fluid may contain other ingredients such as weighting agents, viscosifiers, fluid loss reducing additives, Theological modifying additives, emulsifiers, seepage loss control additives, lubricity additives, defoamers, pH control additives, dispersants and so forth, all of such materials being solubilized, suspended or dispersed in the drilling fluid in such amounts as may be appropriate. It is generally contemplated that any other suitable additive as is known or as may be discovered may be employed in connection with the invention.

The invention further encompasses a drilling fluid additive composition that includes in one embodiment an alkyl glycoside and a borehole stability agent that is selected from among a maltodextrin, a carboxyalkyl starch, hemicellulose, and of the foregoing and that includes in another embodiment desugared molasses solids in conjunction with one or more of the foregoing borehole stability agents and/or in conjunction with an alkyl glycoside. In accordance with this embodiment of the invention, the liquid base is not present, or is present in a smaller amount than is intended in the final drilling composition. The composition may be supplied to drillers, for example, to be used as an additive to seawater or brine in forming a drilling fluid in situ, or may be supplied to fabricators of drilling fluid to be blended with a liquid base. In accordance with this embodiment of the invention, the hemicellulose, starch, and/or maltodextrin preferably are present in an amount ranging from about 0.1% to about 5% by the dry basis weight of the alkyl glucoside or desugared molasses solids (or total dry weight of the molasses solids and alkyl glucoside). The composition may be dry or may be in liquid form, with the hemicellulose, starch, and maltodextrin being dissolved in a liquid. The composition of this embodiment of the invention may include other ingredients, such as salts or other additive, which other ingredient may be employed in such amounts as may be desired The invention also encompasses a drilling fluid that includes methyl glycoside or other alkyl glycoside and cellulose, the alkyl glycoside being present in at least an amount effective to inhibit shale swelling, and the cellulose being present in an amount of at least about 0.1% by weight of the alkyl glycoside. It is contemplated that cellulose may assist the alkyl glycoside in promoting borehole stability. Preferably, the cellulose is present in an amount of from about 0.1% to about 5% by weight of the alkyl glycoside. In this embodiment of the invention, the amount of cellulose in the drilling fluid is irrespective of the amount of dry hemicellulose or maltodextrin in the drilling fluid. In another embodiment, a drilling fluid comprises desugared molasses solids and cellulose, the cellulose being present in an amount ranging from about 0.1% to about 5% by weight of the molasses solids.

Figure 1:
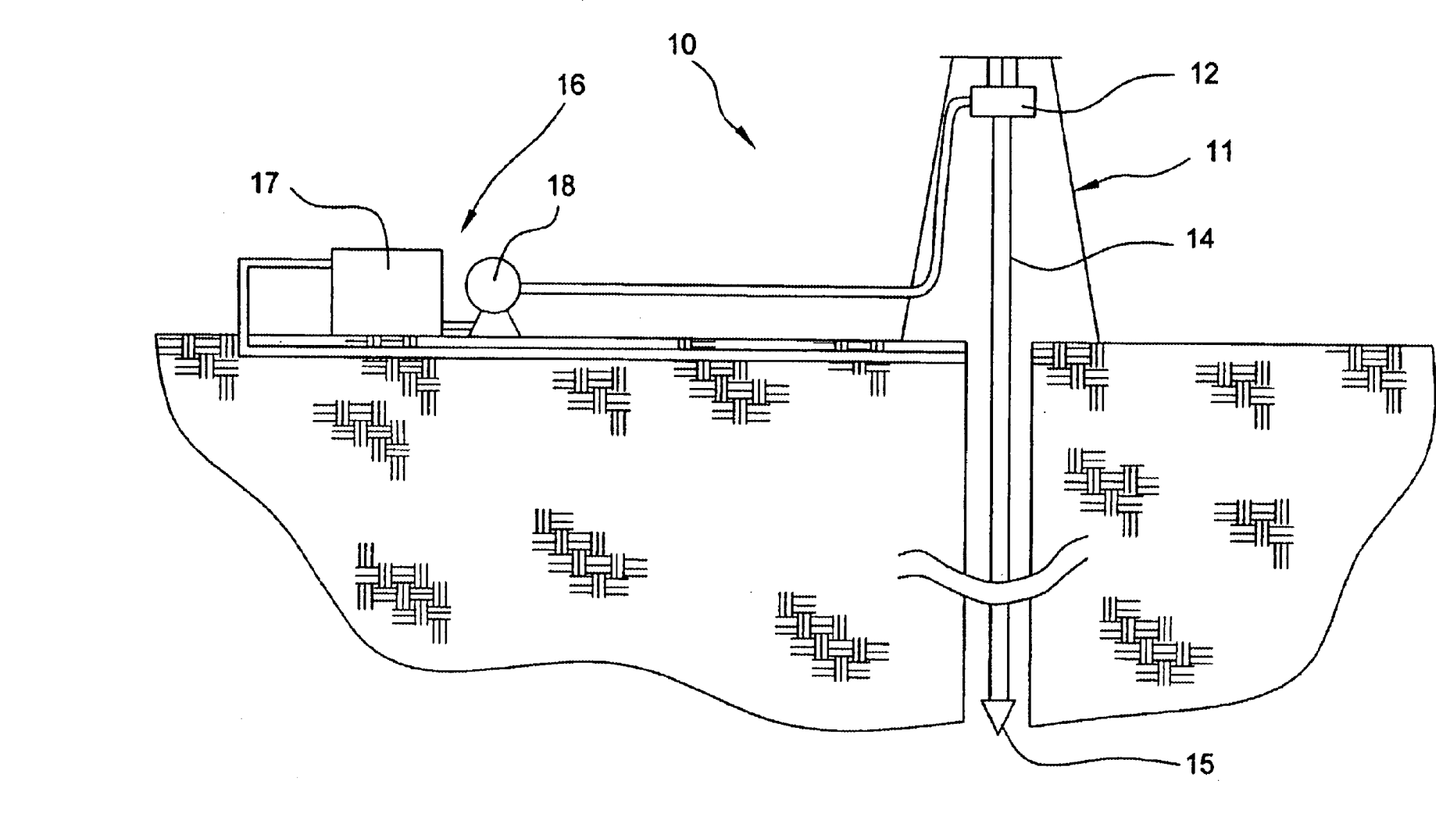
The Figure is a schematic representation of an oil well drilling apparatus.

The invention also encompasses a drilling apparatus. With reference to the Figure, the apparatus is shown generally at 10 and includes a drill string 11, the drill string 11 generally including a drive 12, a drill stem 14, and a drill bit 15 (the drive 12 is shown as a top drive, but other configurations, such as a rotary table, are possible). The drill stem 14 may include components such as drill collars, drill pipe and a kelly (not separately shown). The drill string 11 is fluidically connected to a source 16 of drilling fluid which comprises the drilling fluid of one or more embodiments of the invention Generally, the source, 16 will be suction tanks 17 that are fluidically coupled to mud pumps 18 and optionally a mud pit (not shown). The mud pump circulates fluid through the drill string 11, i.e., through and around the drill bit and/or through the annulus between the drill stem and the borehole. The apparatus generally may take any other conventional or otherwise suitable form and is not limited to the configuration shown in the Figure.

The invention also encompasses a process for drilling. The process includes the step of circulating the drilling fluid of one or more embodiments of the present invention through the drill string of a drilling apparatus during drilling operations. No special apparatus is contemplated by the process of the invention, but instead the process is contemplated to be useful in connection with any suitable drilling apparatus.

The following examples are provided to illustrate the present invention, but should not be construed as limiting in scope.

EXAMPLES

VOLCLAY clay bentonite tablets (American Colloid Company, Skokie, Ill.) were soaked in various drilling fluids and observed over a period of time to simulate the effect of the drilling fluid on shale in a well bore. The stability of each bentonite pellet was evaluated according to the following scale:

1=unaltered
2=hard, intact but loose on surface
3=swollen, softening, still intact
4=together, but no integrity
5=dissolved These evaluations were designed to evaluate the drilling fluids as against one another, rather than to directly evaluate efficiency in actual borehole conditions.

The drilling fluids were prepared using as alkyl glycosides MeG-206 (a 60% aqueous solution of methyl glucoside existing as a 2:1 ratio of $\alpha$:$\beta$ ratio isomers). MeG-365 (a 65% aqueous solution of methyl glucoside existing as a 2:1 ratio of $\alpha$:$\beta$ isomers), and a 70% aqueous solution of methyl glucoside existing as a 1:1 ratio of $\alpha$:$\beta$ ratio) (designated hereunder as MeG-207). As borehole stability agents, MALTRIN® M040, M100, and M180 (maltodextrins available from Grain Processing Corporation of Muscatine, Iowa) and the soluble fraction resulting from alkaline treatment of corn hulls (designated hereunder as "HC") were used. As a control, drilling fluids were prepared using only water and using only MeG-365 or MeG-207, without the addition of hemicellulose, maltodextrin, or molasses. All of the drilling fluids were prepared at an initial pH of 7 unless otherwise indicated.

Control

Drilling fluids were prepared with MeG-365 and MeG-207. The stability of the bentonite pellets in each fluid was evaluated. The stability of the pellets in pure water also was evaluated. The following results were obtained.

| Drilling Fluid | 1 hr. | 2 hr. | 4 hr. | 8 hr. | 24 hr. |
|---|---|---|---|---|---|
| H₂O | 4 | 4.5 | 5 | 5 | 5 |
| 365 | 2 | 2.5 | 3 | 4.5 | 5 |
| 207 | 1 | 1 | 1.5 | 2 | 3 |

| Drilling Fluid | 1 hr. | 2 hr. | 4 hr. | 20 hr. | 30 hr. |
|---|---|---|---|---|---|
| 365 | 2 | 2 | 3.5 | 4.5 | 5 |
| 207 | 1 | 1 | 1.5 | 2.5 | 3 |

| Drilling Fluid | 1 hr. | 4 hr. | 8 hr. | 24 hr. | 32 hr. | 56 hr. |
|---|---|---|---|---|---|---|
| 365 | 1.5 | 3 | 3.5 | 4.5 | — | — |
| 207 | 1 | 1.5 | 2 | 3.5 | 4 | 5 |

| Drilling Fluid | 1 hr. | 2 hr. | 4 hr. | 8 hr. | 24 hr. | 48 hr |
|---|---|---|---|---|---|---|
| 365 | 1.5 | 2 | 3 | 3.5 | 4.5 | — |
| 207 | 1 | 1 | 1.5 | 1.5 | 3 | — |

The bentonite pellets were substantially unstable in water, and fared only somewhat better in the drilling fluids that included methyl glucoside and water but that did not include maltodextrin, hemicellulose, or molasses.

Example 1
MeG+Maltodextrin

Drilling fluids were prepared using methyl glucoside and maltodextrin, and the bentonite stability test was repeated for each fluid. The following results were obtained. Maltodextrin percentages in these tables express weight percent maltodextrin by dry basis of methyl glucoside.

| Drilling Fluid | 1 hr. | 2 hr. | 4 hr. | 8 hr. | 24 hr. |
|---|---|---|---|---|---|
| 365 + 5% M040 | 1 | 1 | 1.5 | 1.5 | 2 |
| 365 + 5% M100 | 1 | 1 | 1.5 | 1.5 | 2.5 |
| 365 + 5% M180 | 1.5 | 1.5 | 2 | 2 | 4 |

| Drilling Fluid | 1 hr. | 2 hr. | 4 hr. | 20 hr. | 30 hr. |
|---|---|---|---|---|---|
| 365 + 1% M040 | 1.5 | 2 | 2.5 | 4 | 4 |
| 365 + 3% M040 | 1 | 1.5 | 1.5 | 2.5 | 3 |

| Drilling Fluid | 1 hr. | 4 hr. | 8 hr. | 24 hr. |
|---|---|---|---|---|
| 365 + 0.5% M100 | 1.5 | 2 | 3.5 | 4 |
| 365 + 1% M100 | 1 | 1.5 | 1.5 | 3.5 |

As set forth above, the bentonite pellets generally were more stable in the drilling fluids of Example 1 than in the control drilling fluids.

Example 2
MeG+Maltodextrin+NaCl

Drilling fluids were prepared using MeG, maltodextrin, and sodium chloride. The bentonite stability test was repeated for each fluid, and the following results were obtained. Sodium chloride percentages in these tables express weight percent sodium chloride by dry basis weight of methyl glucoside.

| Drilling Fluid | 1 hr. | 2 hr. | 4 hr. | 8 hr. | 24 hr. |
|---|---|---|---|---|---|
| 365 + 5% M040 + 10% NaCl | 1 | 1 | 1 | 1.5 | 2 |
| 365 + 5% M100 + 10% NaCl | 1 | 1 | 1.5 | 1.5 | 2 |
| 365 + 5% M180 + 10% NaCl | 1 | 1.5 | 1.5 | 2 | 4 |

| Drilling Fluid | 1 hr. | 2 hr. | 4 hr. | 20 hr. | 30 hr. |
|---|---|---|---|---|---|
| 365 + 1% M040 + 5% NaCl | 1.5 | 1.5 | 1.5 | 2 | 3 |
| 365 + 3% M100 + 5% NaCl | 1 | 1 | 1.5 | 2 | 3 |

| Drilling Fluid | 1 hr. | 4 hr. | 8 hr. | 24 hr. |
|---|---|---|---|---|
| 365 + 0.5% M040 + 2% NaCl | 1.5 | 1.5 | 2.5 | 3.5 |
| 365 + 1% M100 + 2% NaCl | 1 | 1.5 | 1.5 | 3 |
| 365 + 0.5% M100 + 5% NaCl | 1.5 | 2 | 2 | 3.5 |
| 365 + 1% M100 + 5% NaCl | 1 | 1.5 | 1.5 | 3.5 |

As seen, the addition of sodium chloride to the drilling fluid rendered the fluid retention less aggressive toward the bentonite pellets.

Example 3
MeG+HC

Drilling fluids were prepared using MeG and the hemicellulose fraction of alkaline treated corn hulls. The bentonite stability tests were repeated, and the following examples were obtained. Hemicellulose percentages in these tables are expressed as weight percent dry hemicellulose provided in the HC solution by dry basis MeG.

| Drilling Fluid | 1 hr. | 2 hr. | 4 hr. | 8 hr. |
|---|---|---|---|---|
| 365 + 0.6% hemicellulose | 1 | 1 | 1 | 1.5 |
| 365 + 0.6% hemicellulose (solution diluted to 50%) | 2.5 | 3.5 | 4 | 4.5 |

| Drilling Fluid | 1 hr. | 2 hr. | 4 hr. | 20 hr. | 30 hr. |
|---|---|---|---|---|---|
| 365 + 1% hemicellulose | 1 | 1 | 1 | 2 | 2.5 |

| Drilling Fluid | 1 hr. | 2 hr. | 4 hr. | 8 hr. | 24 hr. | 48 hr. |
|---|---|---|---|---|---|---|
| 207 + 0.5% hemicellulose | 1 | 1 | 1 | 1 | 1.5 | 1.5 |
| 365 + 0.6% hemicellulose | 1 | 1 | 1 | 1.5 | — | — |

As seen, the bentonite pellets were substantially more stable in the drilling fluids prepared using MeG and hemicellulose than in the drilling fluids prepared using only MeG.

Example 4
MeG+HC+NaCl

Drilling fluids were prepared using MeG, the hemicellulose and sodium chloride. The bentonite stability tests were repeated and the following results were obtained.

| Drilling Fluid | 1 hr. | 2 hr. | 4 hr. | 20 hr. | 30 hr. |
|---|---|---|---|---|---|
| 365 + 1% hemicellulose + 5% NaCl | 1 | 1 | 1 | 1.5 | 2 |

| Drilling Fluid | 1 hr. | 4 hr. | 8 hr. | 24 hr. | 32 hr. | 56 hr. |
|---|---|---|---|---|---|---|
| 365 + 0.5% hemicellulose + 2% NaCl | 1 | 1.5 | 2 | 2 | 2.5 | 3 |
| 365 + 1% hemicellulose + 5% NaCl | 1 | 1 | 1.5 | 1.5 | 2 | 2.5 |

As seen, the bentonite pellets were substantially more stable in the drilling fluids thus prepared then in the control drilling fluids. Addition of salt to the drilling fluid reduced the aggressiveness of the fluid towards the bentonite pellets.

Comparative Examples 1–11

Drilling fluids were prepared using MeG and other organic additives in accordance with the following table. The bentonite stability test was repeated for each drilling fluid, giving the following results:

| Drilling Fluid | 1 hr. | 2 hr. | 4 hr. | 8 hr. | 24 hr. |
|---|---|---|---|---|---|
| 365 + 10% NaCl* | 2 | 2.5 | 3.5 | 4 | 5 |
| 365 at pH 10 | 2.5 | 3 | 3.5 | 4 | 5 |
| 365 + 5% hydroxy-propyl starch* | 2 | 2.5 | 3 | 3 | — |
| 365 + 2% corn starch* | 2 | 2.5 | 2.5 | 4 | — |
| 365 + 2% solubilized starch* | 1.5 | 2 | 2.5 | 3.5 | 4.5 |
| 365 + 2% polyethylene oxide* | 2 | 2.5 | 3.5 | 4 | 4.5 |
| 365 + 2% ethoxylated starch* | 1.5 | 2.5 | 3.5 | 4 | 4.5 |
| 365 + 2% acid modified starch* | 1.5 | 2 | 3 | 4 | 4.5 |
| 365 + 2% cationic starch* | 1.5 | 2 | 3.5 | 4 | 4.5 |
| 365 + 2% gum arabic* | 1.5 | 2 | 3 | 4.5 | — |
| 365 + 2% guar gum* | 1 | 1 | 1.5 | 2 | — |

*dry basis MeG.

As seen, the bentonite pellets generally were not as stable in the drilling fluids of the comparative examples as in the drilling fluids of the invention. These results demonstrate the surprising benefits of using maltodextrin and/or hemicellulose as a borehole stability agent as compared with other organic species.

Example 5

Water Activity

The water activity, or relative humidity that exists in the space above the drilling fluid in an enclosed container, was evaluated for each of the drilling fluids of the invention and for control drilling fluids. It is believed that the stability of wellbore formations in a drilling fluid generally improves as the water activity value of the drilling fluids decreases.

The following results were obtained:

| | Water activity @ 25° C. |
|---|---|
| Drilling Fluid (Control) | |
| Pure H$_2$O | 1.01 (asmeasured) |
| MeG-365 | 0.864 |
| MeG-207 | 0.789 |
| MeG-207 diluted to 65% solids | 0.851 |
| Drilling Fluid (Invention) | |
| MeG-207 + 0.5% hemicellulose[1] | 0.780 |

-continued

| | Water activity @ 25° C. |
|---|---|
| MeG-365 + 0.5% hemicellulose[1] | 0.889 |
| MeG-365 + 1% hemicellulose[1] | 0.836 |
| MeG-365 + 2% hemicellulose[1] | 0.816 |
| MeG-365 + 0.5% hemicellulose[1] + 2% NaCl[2] | 0.810 |
| MeG-365 + 0.5% hemicellulose[1] + 5% NaCl[2] | 0.727 |
| MeG-365 + 1% hemicellulose[1] + 5% NaCl[2] | 0.768 |
| MeG-365 + 0.5% Maltodextrin[2] | 0.844 |
| MeG-365 + 1% Maltodextrin[2] | 0.855 |
| MeG-365 + 2% Maltodextrin[2] | 0.845 |
| MeG-365 + 0.5% Maltodextrin[2] + 2% NaCl[2] | 0.820 |
| MeG-365 + 0.5% Maltodextrin[2] + 5% NaCl[2] | 0.759 |
| MeG-365 + 1% Maltodextrin[2] + 2% NaCl[2] | 0.811 |
| MeG-365 + 1% Maltodextrin[2] + 5% NaC[2]l | 0.756 |

[1]by net basis, on dry MeG basis.
[2]On dry basis MeG.

Example 6

A drilling fluid comprising MeG-365, 5% MALTRIN® M040 (on dry basis MeG), and 0.6% hemicellulose (on dry basis hemicellulose) is prepared.

Example 7

A drilling composition comprising 50% polyglycerine, 20% water, 1% hemicellulose (dry basis), and 29% MeG (2:1 α:β)(dry basis) is prepared. The MeG is obtained from MeG-365.

Example 8

A drilling composition comprising 50% polyglycerine, 20% water, 1% maltodextrin (MALTRIN® M180) (dry basis), and 29% MeG (2:1 α:β)(dry basis) is prepared. The MeG is obtained from MeG-360.

Example 9

A composition comprising 65% MeG and 2.5% hemicellulose is prepared (balance water). The composition is suitable for addition to seawater to form a drilling fluid.

Example 10

A drilling fluid comprising the following ingredients is prepared

| 350 lbs. | Fresh Water |
|---|---|
| 20 lbs. | Bentonite |
| 4 lbs. | Lime |
| 3 lbs. | Polysaccharide deflocculant |
| 0.75 lb. | KOH |
| 1–2 lbs. | Drilling Starch |
| 0.25 lb. | Lignite |
| 10–30 lbs. | MeG (2:1 α:β) |
| 0.1–0.3 lbs. | Hemicellulose |

Example 11

A composition comprising the following ingredients is prepared:

| | |
|---|---|
| 350 lbs. | Fresh Water |
| 20 lbs. | Bentonite |
| 4 lbs. | Lime |
| 3 lbs. | Polysaccharide Deflocculant |
| 0.75 lb. | KOH |
| 1–2 lbs. | Drilling Starch |
| 0.25 lb. | Lignite |
| 10–30 lbs. | MeG (2:1 α:β) |
| 0.1–0.3 lbs. | Maltodextrin (MALTRIN ® M040) |

Example 12

A composition comprising the following ingredients is prepared:

| | |
|---|---|
| 250 lbs. | Sea Water |
| 11 lbs. | KCl |
| 100 lbs. | Bentonite |
| 0.50 lb. | NaOH |
| 1–4 lbs. | Drilling Starch |
| 10–30 lbs. | MeG (2:1 α:β) |
| 0.1–0.3 lbs. | Hemicellulose |

Example 13

A composition comprising the following ingredients is prepared:

| | |
|---|---|
| 250 lbs. | Sea Water |
| 11 lbs. | KCl |
| 100 lbs. | Bentonite |
| 0.50 lb. | NaOH |
| 1–4 lbs. | Drilling Starch |
| 10–30 lbs. | MeG (2:1 α:β) |
| 0.1–0.3 lbs. | Maltodextrin |

Example 14

Corn hulls from a corn wet milling operation are wet screened through a U.S. No. 6 screen at about 50° C. using sufficient water to substantially remove the fine fiber, most of the starch and some of the protein and lipid material present. The hulls remaining on the screen are then slurried in water and the pH of the slurry is adjusted with lime to pH 6.5 and treated at 79° C. for 1 hour with a B. subtilis alpha-amylase (obtained from Genencor International) at a dosage of about 3 liquefons/g (units as defined by Genencor) of hull solids. The hulls are filtered, washed and dried to a moisture range of 5 to 10 percent a forced air oven at 70° C.

Fifty-two grams (50.6 g d.b.) of the hulls are slurried in 1000 ml of 69 percent aqueous ethanol (v/v) containing 5 g of reagent grade NaOH, and the slurry is heated in a Parr model 4522 pressure reactor at 100° C. for 3 hours. The reaction mixture, at a temperature of about 50° C., is then filtered through a Buchner funnel using Whatman No. 3 filter paper.

The filter cake is then extracted by refluxing at about 82° C. with 1000 ml of 69 percent aqueous ethanol (v/v) for one hour, and the mixture is filtered at a temperature of about 50° C. through a Buchner funnel using Whatman No. 3 paper. The filter cake is next slurried in 1000 ml of 69 percent aqueous ethanol (v/v), and the slurry is adjusted with diluted HCl to pH 2 and is filtered as above. The filtrate is next combined with the filtrates from the two previous filtrations. The combined filtrates then are adjusted to pH 2 with HCl, and evaporated to dryness. The residue is dried in a vacuum oven at 70° C.

To extract the hemicellulose, the filter cake from the above procedure is slurried in 1000 ml of deionized water, held at room temperature for about two hours, and filtered through a coarse sintered glass funnel. This procedure is repeated a second time. The filtrates from these two exactions are combined and concentrated to about 10 percent solids by evaporation of the water on a vacuum rotary evaporator at a temperature of 40° C. and a vacuum of about 20 inches of mercury. The concentrated hemicellulose solution is then dried on a drum drier having a surface temperature of 130° C., and the dried hemicellulose is ground in a Waring blender.

The hemicellulose is added to 10 kg MeG-365 in an amount of 2.5% hemicellulose (on dry basis MeG) to form a drilling fluid.

Example 15

Various drilling fluids were prepared as set forth in detail below. The ability of each fluid to stabilize shale was evaluated by measuring the amount of time required for a bentonite clay pellet to break down (as was determined when the pellet had reached or passed "4" on the scale discussed in the earlier Examples). For control purposes, drilling fluids that included methyl glycoside but that did not include a borehole stability agent were evaluated. The compositions of the drilling fluids that were prepared and the results of the stability tests are set forth below.

| Drilling Fluid | Time to pellet breakdown |
|---|---|
| 365 | <1 day |
| 207 | <2 days |
| 365 + 4% M040 + 4% KOH | 7 days |
| 365 + 4% CMS + 4% KOH | >25 days |
| 365 + 2% CMS + 4% KOH | 5 days |
| 365 + 1% CMS + 4% KOH | 4 days |
| 365 + 2% CMS + 2% KOH | 4 days |
| 365 + 1% CMS + 2% KOH | 3 days |

CMS is carboxymethyl starch having a DS of 0.2

It is thus seen that both the maltodextrin and the carboxymethyl starch tested functioned as borehole stability agents.

As a control for Examples 16 through 20, the following drilling fluids were evaluated.

| Drilling Fluid | 4 hr. | 8 hr. | 16 hr. |
|---|---|---|---|
| MeG-206 | 3 | 3.5 | 4 |
| MeG-207 | 1.5 | 2 | 2 |

Example 16

Five hundred g dry basis corn hulls containing 766 g water was added to sufficient water to give a total weight of 5000 g. The stirred slurry was heated and maintained at 82° C. to 96° C. for two hours. The hot slurry was then filtered through a No. 60 Mesh A.S.T.M.E. Standard Testing Sieve.

The retained solids were subjected to a second treatment of slurrying, stewing, and filtering, and then to a third treatment of slurrying, stewing, and filtering. The retained solids were crumbled, placed on screens, and allowed to air-dry at room temperature.

One hundred g dry basis of the treated corn hulls thus obtained were added to a solution already containing 1610 mL 190 proof ethanol, 390 mL water, and 20 g 50% NaOH in a reaction flask equipped with a reflux condenser and mechanical stirring. The stirred reaction mixture was heated to the reflux temperature and then refluxed for three hours at the reflux temperature of 78° C. The reaction mixture was cooled to 400° C., and then it was vacuum filtered across a 40–60° C. fritted glass funnel. The retained solids were returned to the reaction flask and reslurried in a solution already containing 1610 mL 190 proof ethanol and 390 mL water. The slurry was heated to reflux temperature and then refluxed for one hour at the reflux temperature of 78° C. The reaction mixture was cooled to 20° C., and then it was vacuum filtered across a 40° C. fritted glass funnel. The retained solids were reslurried in a solution already containing 1610 mL 190 proof ethanol and 390 mL water at 200° C., and then the pH of the slurry was adjusted to 6.5 with 5.8N hydrochloric acid. The slurry was then vacuum filtered across a 40–60° C. fritted glass funnel.

The retained solids were reslurried in 2000 mL water in a reaction flask equipped with a reflux condenser and mechanical stirring. The stirred mixture was heated to the reflux temperate and then refluxed for two hours at the reflux temperature of 98° C. The mixture was cooled to 50° C., and then was vacuum filtered across a 40–60° C. fritted glass funnel. The filtrate, re to as FILTRATE A, which contained corn hull hemicellulose, was retained. The retained solids were reslurried in 2000 mL water in a reaction flask equipped with a reflux condenser and mechanical stirring. The stirred mixture was heated to the reflux temperature and then refluxed for two hours at the reflux temperature of 98° C.

The mixture was cooled to 50° C., and then it was vacuum filtered across a 40–60° C. fritted glass funnel. The filtrate, referred to as FILTRATE B, containing the corn hull hemicellulose, was retained. The retained solids were reslurried in 2000 mL water in a reaction flask equipped with a reflux condenser and mechanical stirring. The stirred mixture was heated to the reflux temperature and then refluxed for two hours at the reflux temperature of 98° C. The mixture was cooled to 50° C., and then it was vacuum filtered across a 40–60° C. fritted glass funnel. The filtrate, referred to as FILTRATE C, containing the corn hull hemicellulose was retained. The combined FILTRATES A, B, and C containing the corn hull hemicellulose were assayed to contain 54.5 g solids. Combined filtrates A, B, and C then were spray dried. The resulting hemicellulose was formulated into an adhesive paste by mixing 15 parts weight hemicellulose of the spray-dried hemicellulose with 85 parts water.

A drilling fluid comprising 48.5% MeG-206 (60% solids), 46.5% desugared sugar beet molasses, and 3% hemicellulose was prepared as described above and evaluated for bentonite pellet stability. The following results were obtained

| 4 hr. | 8 hr. | 16 hr. |
|---|---|---|
| 1.5 | 2 | 2 |

As seen, this product established satisfactory results.

Example 17

A drilling fluid composed of 48% MeG-206 (60% solids), 48% desugared sugar beet molasses (60% solids) and 4% corn hull hemicellulose prepared as in Example 16 was prepared and evaluated for bentonite pellet stability. The following results were obtained.

| 4 hr. | 8 hr. | 16 hr. |
|---|---|---|
| 2 | 1.5 | 1.5 |

As seen, this product exhibited excellent results.

Example 18

A drilling fluid composed of 97% MeG-206 and 3% corn hull hemicellulose prepared as in Example 16 was prepared and evaluated for bentonite pellet stability.

The following results were obtained.

| 4 hr. | 8 hr. | 16 hr. |
|---|---|---|
| 2 | 3 | 3.5 |

As seen, this product exhibited somewhat satisfactory results.

Example 19

A drilling fluid comprising 50% MeG-206 and 50% desugared sugar beet molasses was prepared and evaluated for bentonite pellet stability. The following results were obtained.

| 4 hr. | 8 hr. | 16 hr. |
|---|---|---|
| 1.5 | 2.5 | 2.5 |

As sen, this product exhibited satisfactory results.

Example 20

A drilling fluid comprising 49% MeG-206, 49% desugared sugar beet molasses, and 2% corn hull hemicellulose prepared in accordance with the teachings of U.S. Pat. No. 6,063,178 to McPherson et al., assignor to Grain Processing Corporation of Muscatine, Iowa was prepared and evaluated for bentonite pellet stability. The following results were obtained.

| 4 hr. | 8 hr. | 16 hr. |
|-------|-------|--------|
| 1 | 1.5 | 1.5 |

As seen, this product exhibited excellent results.

Example 21

The following drilling fluids were evaluated for bentonite pellet stability at 16 hours. The results are shown following the description of the drilling fluid. In this example, the hemicellulose was a dry solid prepared in accordance with the description provided in prior U.S. Pat. No. 6,063,178.

| Drilling Fluid | 16 hr. |
|----------------|--------|
| MeG-206 | 4 |
| Desugared Sugar Beet Molasses (60% solids) | 2.5 |
| 98% MeG-206 + 2% hemicellulose | 3 |
| 98% Desugared Sugar Beet Molasses (60% solids) + 2% hemicellulose | 2 |

Example 22

A drilling fluid comprising desugared cane sugar molasses that has been diluted to 30% solids with-salt water is circulated through a drill string.

Thus, the foregoing general objects have been satisfied. The invention provides a drilling fluid that is suitable for use in connection with borehole drilling. The invention further provides a drilling apparatus and method that incorporate the improved drilling fluid.

While particular embodiments of the invention have been shown, it will be understood that the invention is not limited thereto since modifications may be made by those skilled in the art, particularly in light of the foregoing teachings. For instance, the pH or salt content of the disclosed fluids may be modified, or, more generally, other components may be altered. It is therefore contemplated that the invention encompasses the subject matter of the following claims and equivalents thereof. All references cited herein are hereby incorporated by reference in their entireties.

What is claimed is:

1. A composition comprising:

an alkyl glycoside selected from among the α-form, the β-form, and mixtures thereof, said alkyl glycoside selected from among the methyl, ethyl, propyl, and butyl glucosides of glucose; and desugared molasses solids, said desugared molasses solids being present in at least an amount effective to inhibit shale swelling.

2. A composition according to claim 1, further comprising a borehole stability agent, said borehole stability agent being selected from the group consisting of a carboxyalkyl starch, a maltodextrin, hemicellulose, and mixtures thereof, said borehole stability agent being present in an amount ranging from about 0.1% to about 5% by dry basis weight of said alkyl glucoside.

3. A composition according to claim 1, said alkyl glycoside comprising methyl glucoside.

4. A composition according to claim 1, said alkyl glycoside including a 2:1 ratio of α:β isomers of methyl glucoside.

5. A composition according to claim 1, said alkyl glycoside including a 1:1 ratio of α:β isomers of methyl glucoside.

* * * * *

UNITED STATES PATENT AND TRADEMARK OFFICE
CERTIFICATE OF CORRECTION

PATENT NO.         : 6,806,231 B2                                          Page 1 of 2
APPLICATION NO.    : 10/336540
DATED              : October 19, 2004
INVENTOR(S)        : Kevin H. Schilling et al.

It is certified that error appears in the above-identified patent and that said Letters Patent is hereby corrected as shown below:

On the Cover Page, (*) Notice section:
    Please Insert --This patent is subject to a Terminal Disclaimer--

In Column 2, Line 38:
    Please replace "all" with --alkyl--

In Column 3, Line 56:
    Please replace "moles" with --molasses--

In Column 7, Line 10:
    Please replace "firer" with --further--

In Column 7, Line 32:
    Please replace "Theological" with --rheological--

In Column 7, Line 44:
    Please replace "and of" with --and mixtures of--

In Column 10, Line 2:
    Please replace "maltodextrin" with --maltrodextrin--

In Column 12, Line 8:
    Please replace "$^{+\ 2\%\ NaCl(2)}$" with --+ 2% NaCl(2)--

In Column 14, Lines 13-14:
    Please replace "exactions" with --extractions--

In Column 15, Line 36:
    Please replace "re" with --referred--

UNITED STATES PATENT AND TRADEMARK OFFICE
CERTIFICATE OF CORRECTION

PATENT NO. : 6,806,231 B2
APPLICATION NO. : 10/336540
DATED : October 19, 2004
INVENTOR(S) : Kevin H. Schilling et al.

It is certified that error appears in the above-identified patent and that said Letters Patent is hereby corrected as shown below:

In Column 16, Line 57:
    Please replace "sen" with --seen--

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 6,806,231 B2  
APPLICATION NO. : 10/336540  
DATED : October 19, 2004  
INVENTOR(S) : Kevin H. Schilling et al.

It is certified that error appears in the above-identified patent and that said Letters Patent is hereby corrected as shown below:

On the Cover Page, (*) section:
Please Insert --This patent is subject to a Terminal Disclaimer--

In Column 2, Line 38:
Please replace "all" with --alkyl--

In Column 3, Line 56:
Please replace "moles" with --molasses--

In Column 7, Line 10:
Please replace "firer" with --further--

In Column 7, Line 32:
Please replace "Theological" with --rheological--

In Column 7, Line 44:
Please replace "and of" with --and mixtures of--

In Column 10, Line 2:
Please replace "maltodextrin" with --maltrodextrin--

In Column 12, Line 8:
Please replace "$^{+2\% \; NaCl(2)}$" with --+2% NaCl(2)--

In Column 14, Lines 13-14:
Please replace "exactions" with --extractions--

In Column 15, Line 36:
Please replace "re" with --referred--

UNITED STATES PATENT AND TRADEMARK OFFICE
CERTIFICATE OF CORRECTION

PATENT NO. : 6,806,231 B2
APPLICATION NO. : 10/336540
DATED : October 19, 2004
INVENTOR(S) : Kevin H. Schilling et al.

It is certified that error appears in the above-identified patent and that said Letters Patent is hereby corrected as shown below:

In Column 16, Line 57:
    Please replace "sen" with --seen--

Signed and Sealed this

Twenty-seventh Day of March, 2007

JON W. DUDAS
*Director of the United States Patent and Trademark Office*